(12) United States Patent
Morikuni et al.

(10) Patent No.: US 7,834,990 B2
(45) Date of Patent: Nov. 16, 2010

(54) EVALUATION METHOD FOR EVALUATING OPTICAL CHARACTERISTICS OF OPTICAL SYSTEM, EVALUATION METHOD FOR EVALUATING PROJECTOR, EVALUATION DEVICE FOR EVALUATING OPTICAL CHARACTERISTICS, AND SCREEN

(75) Inventors: Eiji Morikuni, Shiojiri (JP); Hideya Seki, Okaya (JP); Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 12/003,018

(22) Filed: Dec. 19, 2007

(65) Prior Publication Data
US 2008/0151266 A1    Jun. 26, 2008

(30) Foreign Application Priority Data
Dec. 26, 2006    (JP)    ............................. 2006-348867

(51) Int. Cl.
*G01B 9/00*    (2006.01)
(52) U.S. Cl. ..................................... 356/124
(58) Field of Classification Search .......... 356/124–127
See application file for complete search history.

(56) References Cited

U.S. PATENT DOCUMENTS

| | | | |
|---|---|---|---|
| 5,062,705 A | * | 11/1991 | Sato et al. .................... 356/124 |
| 5,477,394 A | | 12/1995 | Shibazaki |
| 5,495,306 A | | 2/1996 | Shibazaki |
| 5,499,067 A | | 3/1996 | Shibazaki |
| 5,767,959 A | * | 6/1998 | Kobayashi ................... 356/124 |
| 5,973,773 A | * | 10/1999 | Kobayashi ................... 356/124 |
| 6,717,661 B1 | * | 4/2004 | Bernstein et al. ............ 356/121 |
| 6,816,247 B1 | | 11/2004 | Heppner et al. |
| 2003/0184669 A1 | | 10/2003 | Nishioka et al. |

FOREIGN PATENT DOCUMENTS

| | | |
|---|---|---|
| JP | A 60-247133 | 12/1985 |
| JP | A-62-036531 | 2/1987 |
| JP | A-03-134538 | 6/1991 |
| JP | A-7-13157 | 1/1995 |
| JP | A-2003-270091 | 9/2003 |
| JP | A-2004-4496 | 1/2004 |

* cited by examiner

*Primary Examiner*—Michael P Stafira
(74) *Attorney, Agent, or Firm*—Oliff & Berridge, PLC (57) ABSTRACT

An evaluation method for evaluating optical characteristics of an optical system, the evaluation method includes: providing an optical system that is an evaluation object and that has a light incidence section and a light emission section; disposing a first pattern having a fist predetermined pitch, in an optical path of light which is incident onto the light incidence section; disposing a projection surface having a second pattern with a second predetermined pitch, at the position to which the light emitted from the light emission section is reached; projecting an image of the first pattern onto the projection surface through the optical system; and evaluating the optical characteristics of the optical system by observing a state of moiré fringes which are generated onto the projection surface due to interference between the image and the second pattern.

12 Claims, 9 Drawing Sheets

EVALUATION METHOD FOR EVALUATING OPTICAL CHARACTERISTICS OF OPTICAL SYSTEM, EVALUATION METHOD FOR EVALUATING PROJECTOR, EVALUATION DEVICE FOR EVALUATING OPTICAL CHARACTERISTICS, AND SCREEN

CROSS-REFERENCE TO RELATED APPLICATION

This application is based on and claims priority from Japanese Patent Application No. 2006-348867, filed on Dec. 26, 2006, the contents of which are incorporated herein by reference.

BACKGROUND

1. Technical Field

The present invention relates to an evaluation method for evaluate the optical characteristics of an optical system, an evaluation method for evaluating a projector, an evaluation device for evaluating optical characteristics, and a screen.

2. Related Art

In a conventional optical system included in an optical device such as a projector or the like, optical characteristics of an optical member such as a projection lens or the like have been measured and evaluated by using, for example, a generalized MTF (Modulation Transfer Function) measuring device.

However, since the MTF measuring device is expensive, and the measurement itself is complicated and time-consuming, the MTF measuring device has not been easily used for evaluation of optical characteristics.

Excessive time has been consumed for 100% inspection of projection lenses in a mass-production line for example.

Furthermore, not only for a single lens, but also for optical members in a state of final composition, specifically, in a state of the projection lenses finally composed, it is difficult to measure the optical characteristics thereof with precision.

In addition, an ultra short-focus projector including "Ultra Short-Focus Optical System" has recently been developed, in which a projection engine is exceptionally close to a wall (screen) and the projection distance is extremely short.

In a conventional projector, a linear optical system including only lenses has been commonly used.

However, in the ultra short-focus projector, not only lenses, but also reflection optical systems using an aspheric mirror, a free-form surface mirror, or the like, or an optical system reflecting an optical path using a planar mirror, a prism, or the like are often adopted.

The reflection optical system has an optical arrangement in which the optical path is reflected and which is substantially custom-made, compared with a conventional linear optical system.

Therefore, in the case of measuring the optical characteristics by the conventional measuring device such as an MTF measuring device or the like, a special alteration must be performed on the measuring device or a measurement object. Otherwise it is impossible to measure the optical characteristics.

Because of the above circumstances, development of a comparatively simple measurement and evaluation method is a matter requiring immediate attention.

However, as a lens performance measuring method, which is different from a conventional measurement and evaluation method which is a simple method, a "measuring method for focal distance of lens due to moiré fringes" is disclosed in Japanese Unexamined Patent Application, First Publication No. S60-247133.

In this method, two grid plates in which pitch is identical are adjacently disposed behind a lens, generating moiré fringes by causing parallel light to be incident thereonto, and the focal distance of the lens is measured based on the gradient of the moiré fringes.

In Japanese Unexamined Patent Application, First Publication No. S60-247133, though the focal distance can be very easily measured. However, this is merely a method for measuring the focal distance of lens. It is impossible to measure the basic performance of an optical system, for example, focalization, distortion, or the like.

SUMMARY

An advantage of some aspects of the invention is to provide an evaluation method for evaluating the optical characteristics of an optical system, an evaluation method for evaluating a projector, an evaluation device for evaluating optical characteristics, and a screen, in which it is possible to easily measure and evaluate the basic performance of an optical system including focalization, distortion, or the like.

A first aspect of the invention provides an evaluation method for evaluating optical characteristics of an optical system, the evaluation method including: providing an optical system that is an evaluation object and that has a light incidence section and a light emission section; disposing a first pattern having a fist predetermined pitch, in an optical path of light which is incident onto the light incidence section; disposing a projection surface having a second pattern with a second predetermined pitch, at the position to which the light emitted from the light emission section is reached; projecting an image of the first pattern onto the projection surface through the optical system; and evaluating the optical characteristics of the optical system by observing a state of moiré fringes which are generated onto the projection surface due to interference between the image and the second pattern.

Here, "projecting an image of the first pattern onto the projection surface through the optical system" means that the light has been emitted from a portion on which the first pattern is formed, the light has been incident onto the optical system, and the image is formed by the light emitted from the optical system.

For example, if the optical system that is the evaluation object has perfect optical characteristics, both the image of the first pattern and the second pattern are perfectly overlapped with each other when projecting the image of the first pattern so as to overlap the second pattern on the projection surface. In this case, the image of the first pattern can be obtained on the projection surface in such a manner that it seems as though the projection surface does not visually include the second pattern.

In contrast, if the optical system has distortion, irregularity of focalization, or the like, even when tying to overlap both the image of the first pattern and the second pattern on the projection surface, the image is slightly shifted from the second pattern.

Thereby, the image displayed on the projection surface, which is based on the first pattern. The image and the second pattern interfere with each other. The moiré fringes are generated on the projection surface.

By observing the generation state of the moiré fringes (pitch, degree of bending, a state of focalization, or the like), the optical characteristics of the optical system can be evaluated.

In this manner, by only providing the first pattern disposed in the optical path in which the light is incident onto the light incidence section of the optical system, and the second pattern disposed at the position to which the light emitted from the light emission section of the optical system is reached, it is possible to evaluate the optical characteristics including distortion, focalization, or the like.

Therefore, it is unnecessary to configure the measuring device or the measurement object. Not only that, but it is also unnecessary to provide the measuring device. Thereby, it is possible to perform the evaluation simply, quickly, and inexpensively compared to conventional methods.

The evaluation method of the first aspect of the invention is not a method similar to that used in a conventional measuring device, in which a plurality of measurement points is determined on a projection surface and the measuring is performed at the measurement points.

In the evaluation method of the first aspect of the invention, since the moiré fringes appearing on the entire projection surface are observed, it is possible to realize contiguous evaluation on the entire optical transparent region of the optical system.

It is preferable that, in the evaluation method of the first aspect of the invention, the first pattern be a pattern formed on the surface of a translucent plate member.

In this manner, it is sufficient that by only providing the translucent plate member including the surface on which the pattern is formed, i.e., a translucent plate on which the pattern is drawn. It is unnecessary to provide an expensive measuring device, and it is possible to easily measure and evaluate the optical characteristics.

It is preferable that, in the evaluation method of the first aspect of the invention, the first pattern be a pattern which is displayed on or projected onto a translucent plate member.

In this manner, the first pattern is not fixed, and the formation of the first pattern or the pitch of the first pattern can be freely varied. Thereby, it is possible to easily realize the evaluation while varying the generation state of the moiré fringes, as needed.

It is preferable that, in the evaluation method of the first aspect of the invention, the second pattern be a pattern drawn on the projection surface.

In this manner, it is sufficient that by only previously drawing the pattern on a screen constituting the projection surface. For example, it is unnecessary to provide an expensive measuring device, and it is possible to easily measure and evaluate the optical characteristics.

It is preferable that, in the evaluation method of the first aspect of the invention, the second pattern be a pattern which is displayed on or projected onto the projection surface.

In this manner, though a projection device or a display device is necessary so as to project or display the pattern onto the projection surface, it is possible to realize the measuring and the evaluation by using a conventional screen on which a pattern is not drawn.

Furthermore, since the formation of the second pattern or the pitch of the second pattern can be freely varied, it is possible to easily realize the evaluation while varying the generation state of the moiré fringes, as needed.

It is preferable that, in the evaluation method of the first aspect of the invention, the optical system be a reflection optical system including either an aspheric mirror or a free-form surface, mirror, and the optical characteristics of the aspheric mirror or the optical characteristics of the free-form surface mirror be evaluated.

In a conventional measuring method, a plurality of measurement points is determined on a projection surface and the measuring is performed at the measurement points. In this case, the optical characteristics of the aspheric mirror or the free-form surface mirror are not directly varied, and the optical characteristics may be unstably varied or may have inflection points. Therefore, precision of measurement is degraded in the case of calculating the optical characteristics while directly interpolating the spacing of the measurement points.

In contrast, according to the evaluation method of the first aspect of the invention, since it is possible to realize contiguous and relevant evaluation of the entire optical system. Especially, it is preferable that the method be suited to the evaluating the aspheric mirror, the free-form surface mirror, or the like.

It is preferable that the evaluation method of the first aspect of the invention further include: deforming the aspheric mirror or the free-form surface mirror based on the observation result of the generation state of the moiré fringes; and the re-evaluating the optical characteristics of the aspheric mirror or the optical characteristics of the free-form surface mirror.

In this manner, based on the feedback from the observation result of the moiré fringes, the aspheric mirror or the free-form surface mirror is deformed, and the optical characteristics are re-evaluated. Thereby, it is possible to easily optimize the formation of the aspheric mirror or the free-form surface mirror so as to obtain the desired optical characteristics.

A second aspect of the invention provides an evaluation method for evaluating a projector, including: providing a projector including an optical system that is an evaluation object, a light modulation element that has a first pattern having a first predetermined pitch, and a projection surface that has a second pattern having a second predetermined pitch; using the light modulation element and the projection surface; projecting an image of the first pattern of the light modulation element onto the projection surface through the optical system; and evaluating the optical characteristics of the optical system by observing a state of moiré fringes which are generated onto the projection surface due to interference between the image and the second pattern.

In this manner, by only providing the light modulation element including the first pattern and the projection surface including the second pattern, it is possible to evaluate the optical characteristics including distortion, focalization, or the like.

For example, in the light modulation element such as a liquid crystal light valve or the like, a black matrix is conventionally used. It is preferable to use the black matrix as the first pattern.

En this case, by only performing white display from the entire light modulation element, it is possible to project the image including a grid-like formation, which is based on the first pattern onto the projection surface including the second pattern.

Thereby, it is possible to perform the evaluation simply, quickly, and inexpensively compared with conventional methods. It is possible to obtain the effects or the like similar to the above-described effects. For example, it is possible to realize contiguous evaluation of the entire optical system.

It is preferable that, in the evaluation method of the second aspect of the invention, the first pattern be a pattern which is displayed by the light modulation element.

In this manner, the first pattern is not fixed, and the formation of the first pattern or the pitch of the first pattern can be freely varied. Thereby, it is possible to easily realize the evaluation while varying generation state of the moiré fringes, as needed.

It is preferable that in the evaluation method of the second aspect of the invention, the second pattern be a pattern drawn on the projection surface, or the second pattern be a pattern which is displayed on or projected onto the projection surface.

It is preferable that, in the evaluation method of the second aspect of the invention, the projector include a reflection optical system including an aspheric mirror or a freeform surface mirror, the optical system be the reflection optical system, and the optical characteristics of the aspheric mirror or the optical characteristics of the free-form surface mirror be evaluated.

It is preferable that the evaluation method of the second aspect of the invention further include: deforming the aspheric mirror the free-form surface mirror based on the observation result of the generation state of the moiré fringes; and re-evaluating the optical characteristics of the aspheric mirror or the optical characteristics of the free-form surface mirror.

In these manners, it is possible to obtain the above-described operation and effects.

A third aspect of the invention provides an evaluation device for evaluating optical characteristics including: a plate member that is disposed in an optical path of light which is incident onto a light incidence section of an optical system being an evaluation object, and that has a first pattern having a first predetermined pitch; a light source illuminating the plate member with light; and a projection surface onto which an image of the first pattern is projected, that has a second pattern having a second predetermined pitch, and that is disposed at the position to which the light emitted from the light emission section of the optical system is reached, the image being projected through the optical system.

By using the evaluation device, it is possible to measure and evaluate the optical characteristics simply, quickly, inexpensively, and with a high level of precision compared with conventional methods.

A fourth aspect of the invention provides a screen including a projection surface onto which an image of a first pattern is projected, that has a second pattern having a second predetermined pitch, the first pattern having a first predetermined pitch and being included in a light modulation element or in a plate member, the light modulation element or the plate member being disposed in an optical path of light which is incident onto a light incidence section of the optical system, the optical system being an evaluation object.

By using the screen, it is possible to measure and evaluate the optical characteristics simply, quickly, inexpensively, and with a high level of precision compared with conventional methods.

BRIEF DESCRIPTION OF THE DRAWINGS

FIGS. 1A to 1C are schematic diagrams for explanation of an evaluation method for evaluating optical characteristics of a first embodiment of the invention.

FIGS. 3A to 3C are schematic diagrams for explanation of an evaluation method for evaluating optical characteristics of a second embodiment of the invention.

FIGS. 5A to 5C are schematic diagrams for explanation of an evaluation method for evaluating optical characteristics of a fourth embodiment of the invention.

FIGS. 6A to 6C are schematic diagrams for explanation of evaluation method for evaluating optical characteristics of a fifth embodiment of the invention.

DESCRIPTION OF EXEMPLARY EMBODIMENTS

First Embodiment

Hereinafter, a first embodiment of the invention will be described with reference to FIGS. 1A to 1C and 2.

This embodiment is an example method for measuring and evaluation of the optical characteristics of a liquid crystal projector. Specifically, this method is for measuring and evaluation of the optical characteristics of a projection lens which is a projection optical system, by measuring and evaluating the whole device including the projection lens, not for a single lens.

Figure 1A:
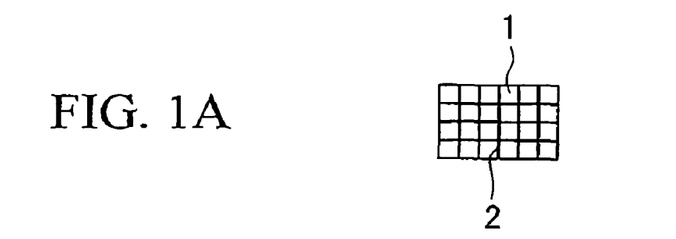
FIG. 1A is a plan view showing a liquid crystal light valve.
Figure 1B:
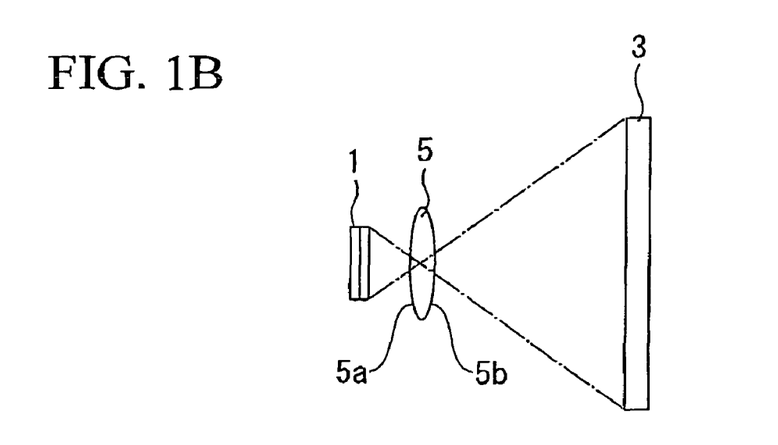
FIG. 1B is a cross-sectional view showing a liquid crystal light valve, a projection lens, and a screen.
Figure 1C:
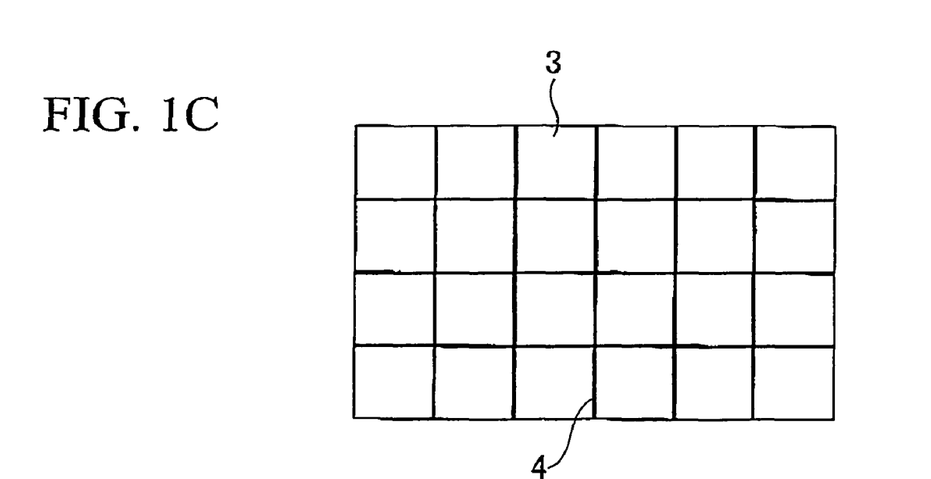
FIG. 1C is a plan view showing a screen.

FIGS. 1A to 1C are schematic diagrams for explanation of an evaluation method for evaluating optical characteristics of the first embodiment. FIG. 1A is a plan view showing a liquid crystal light valve 1. FIG. 1B is a cross-sectional view showing the liquid crystal light valve 1, a projection lens 5, and a screen 3. FIG. 1C is a plan view showing the screen 3.

Figure 2:
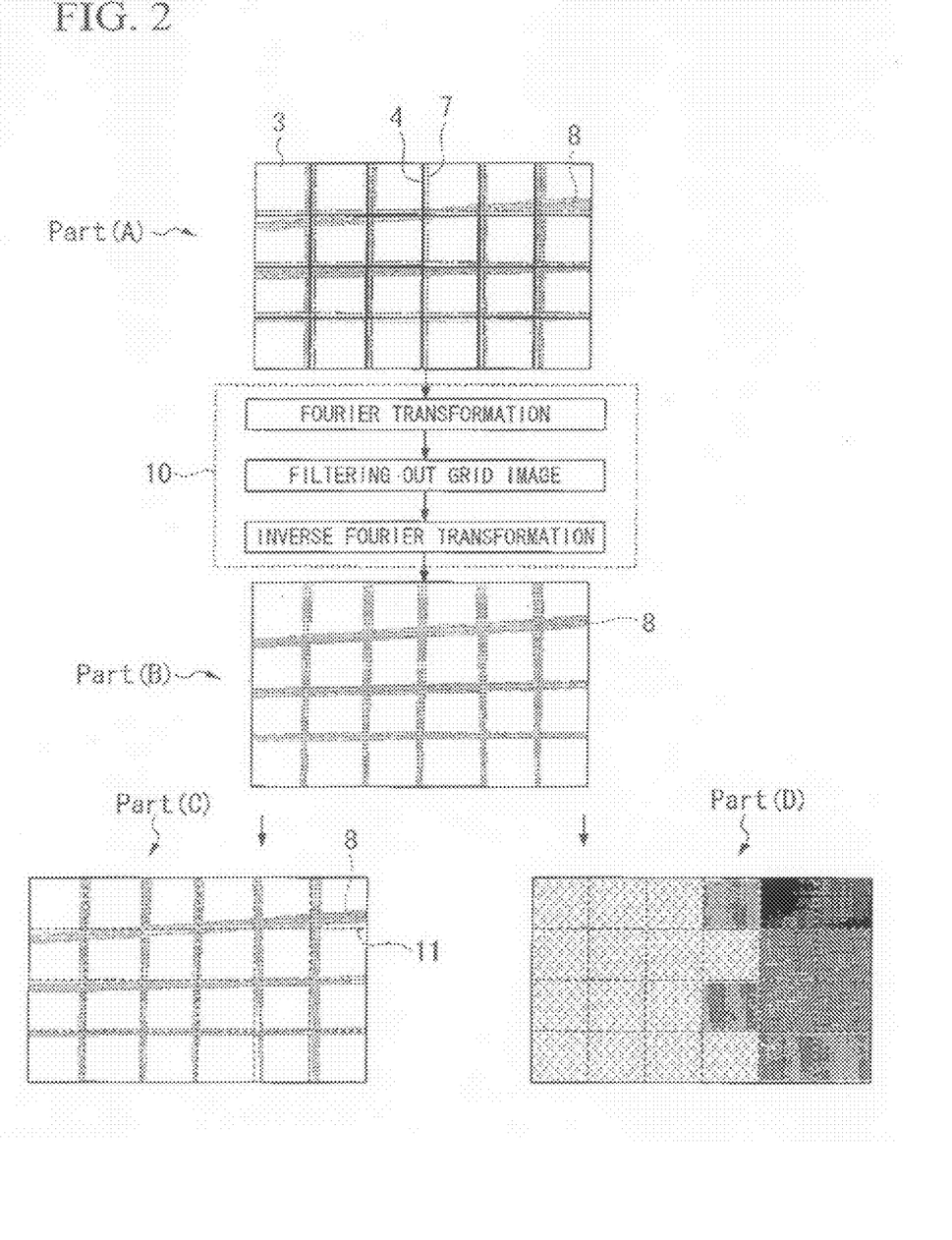
FIG. 2 is a view showing an algorithm of an image processing that is used in the evaluation method of the first embodiment of the invention.

FIG. 2 is a view showing an algorithm of an image processing that is used in this evaluation method.

FIG. 1B shows only the liquid crystal light valve and the projection lens, which are optically relevant to this evaluation method, in the projector including a lot of kinds of optical members. The other optical members are omitted in FIG. 1B.

At first, the projector and the screen 3 (projection surface) are disposed so as to lead an image, which is formed by the liquid crystal light valve 1 (light modulation element) to be projected onto the screen 3.

Projection lens 5 (optical system) is an evaluation object and includes a light incidence section 5a and a light emission section 5b.

As shown in FIG. 1A, the liquid crystal light valve 1 includes a grid-like black matrix 2 formed on a display region (first pattern). The black matrix 2 divides between the pixels that are adjacently arrayed.

The black matrix 2 has a predetermined pitch (first predetermined pitch). In the liquid crystal light valve 1, the black matrix 2 is positioned in an optical path in which light is incident onto the light incidence section 5a.

On the other hand, grid lines 4 (second pattern) are previously drawn on the screen 3. The grid lines 4 are composed of a plurality of lines which are extended in a horizontal direction and a vertical direction orthogonal to each other.

The grid lines 4 have a predetermined pitch (second predetermined pitch). In the screen 3, the grid lines 4 are formed at the position to which the light emitted from the light emission section 5b is reached.

The grid lines 4 correspond to the image based on the black matrix 2 of the liquid crystal light valve 1.

That is, in the case in which the image of the liquid crystal light valve 1 is projected onto the screen 3 while enlarging at a predetermined enlargement ratio, the grid lines 4 drawn on the screen 3 are drawn so as to coincide with the positions and the dimensions of the enlarged image based on the black matrix 2 when the black matrix 2 is enlarged and projected at the predetermined enlargement ratio onto the screen 3.

The grid lines 4 may be black lines drawn by a printing device such as an inkjet printer or the like.

Therefore, on the assumption that the projection lens 5 of the projector has perfect optical characteristics, when performing white display from the entire liquid crystal light valve 1 and when projecting onto the screen 3 by the projection lens 5, both the image based on the black matrix 2 and the grid lines 4 formed on the screen 3 are perfectly overlapped with each other, and the image based on the black matrix 2 can be projected in such a manner that it seems as though the image being projected onto a white screen on which grid lines is not drawn in visual.

However, since the projection lens 5 actually has slight distortion, irregularity of focalization, or the like, both the image based on the black matrix 2 and the grid lines 4 drawn on the screen 3 are not perfectly overlapped, and are slightly shifted from each other.

Thereby, the image displayed on the screen 3. The image is based on the black matrix 2. The image and the grid lines 4 interfere with each other. Moiré fringes are generated on the screen 3.

At this time, by observing gradient of the moiré fringes, pitch, width, degree of focalization, or the like of the moiré fringes, or by adequately performing an image processing to the moiré fringes, it is possible to obtain the optical characteristics of the projection lens 5 including distortion, irregularity of focalization, or the like.

FIG. 2 shows an example of an algorithm of a specific image processing. The image processing is explained below with reference to this example.

The evaluation method of the first embodiment can also be realized by using an algorithm other than the algorithm described below.

Part (A) shown in upper side of FIG. 2 shows the picture of the screen 3 onto which a black matrix image 7 (indicated by dashed and two-dotted lines) is projected by using the constitution shown in FIGS. 1A to 1C. The picture is photographed by an image capturing element (image input device) such as a CCD (charged-coupled device) or the like.

Here, the black matrix image 7 means the image projected onto the screen 3, and has been enlarged from the pre-enlarged image formed by the liquid crystal light valve 1, by passing through the projection lens 5.

As described above, the moiré fringes 8 are generated on the screen 3 and caused by the shift between the black matrix image 7 and the grid lines 4 (indicated by solid lines).

In Part (A) of FIG. 2, the moiré fringes are drawn for explanation so as to be easily understood, and may be different in appearance from what actual moiré fringes generate.

In the precondition of the above explanation, the grid lines 4 are drawn on the screen 3 so as to coincide with the positions and dimensions of the black matrix image 7. That is, the black matrix image 7 is coincided with the grid lines 4 on the screen 3 (the pitch of black matrix image 7 and the pitch of grid lines 4 are coincided each other).

However, in the case of shifting the black matrix image 7 relative to the grid lines 4 actuality, the moiré fringes 8 will be enlarged and the measuring thereof will be easy. Therefore, the black matrix image 7 and the grid lines 4 may be intentionally shifted.

Next, the image processing is performed to the image that has been input to the image capturing element (image input device), and an image component of black matrix image 7 and an image component of grid lines 4 are removed in an image processing section 10.

Specifically, in the image processing section 10, Fourier transformation is performed on the entire image having been input, and a frequency component corresponding to a component of a grid image is filtered out from the image. Inverse-Fourier transform is performed on the image, thereby, the grid image is removed.

Part (B) shown in a center of FIG. 2 shows the image in which the component of grid image is removed as described above, and a component of moiréfringes 8 alone remains.

By using the image shown in Part (B) of FIG. 2, in which the grid image has been removed, it is possible to obtain the two optical characteristics described below.

To begin with, it is possible to measure the distortion of the projection lens 5.

In contrast, in the case of a conventional measuring method, for example, the amount of shift between pixels and theoretical reference positions is measured at nine measurement points in the image projected onto a screen in the display.

Therefore, though the distortion can be measured at the measurement points, there is no method, other than the conjecturing method based on the measurement value at the measurement points, for measuring how much amplitude of distortion the entire optical system has, and for obtaining the tendency of distortion generation.

However, a lens or a mirror having an aspheric-form surface or a free-form surface is often used in recent optical systems, thereby, the conjecturing of the entire optical system based on only the measurement value at the several measurement points is uncertain.

Specifically, in the case of a sphere, and when there are measurement values at both ends of measurement points thereof, there is no serious problem, even by directly interpolating the spacing of the measurement points. However, in the case of the aspheric-form surface or the free-form surface, there are inflection points of measurement value in the display, so it is difficult to obtain these inflection points based on the rough measurement points such as described above.

In contrast, in the case of using the evaluation method of the first embodiment, degree of distortion, that is, the gradient of the moiré fringes 8 varies depending on the amount of shift between the black matrix image 7 and the grid lines 4

Due to measuring the gradient of the moiré fringes 8 relative to the reference line 11 based on the image of the moiré fringes 8 shown in Part (C) shown lower and on the left side of FIG. 2, it is possible to contiguously obtain the variation of the distortion in the entire display.

Here, as described above, since the moiré fringes 8 are enlarged by varying each pitch of black matrix image 7 and the grid lines 4, the measuring is easy, compared with a conventional method in which the shift between the pixels is measured.

Furthermore, by increasing the enlargement ratio of the moiré fringes 8, it is possible to determine the amount of distortion by a visual inspection, without providing a special observation device and image processing system.

Thereby, it is possible to perform a 100% inspection of the optical characteristics of the projector in a mass-production line or the like. It is possible to simply, inexpensively, and quickly measure the distortion with a high level of precision, by only providing the screen 3 on which the grid lines 4 are drawn.

Figure 8:
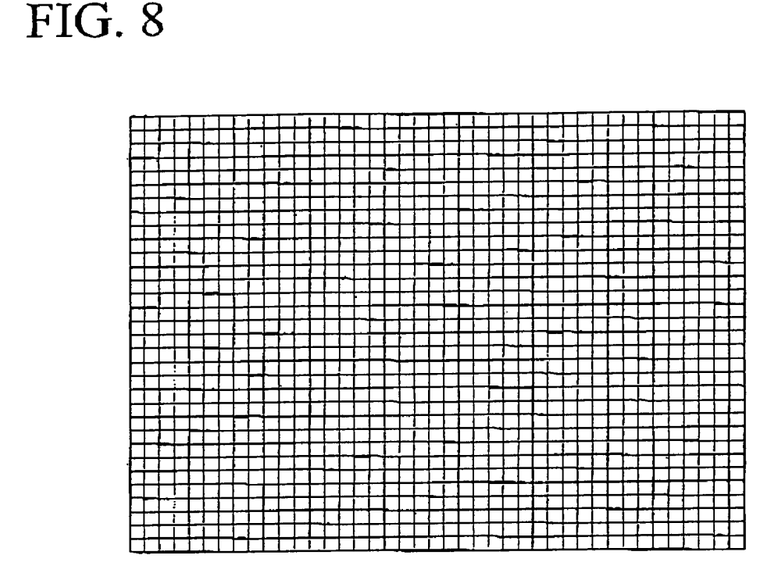
FIG. 8 shows a state in which the moiré fringes obtained by the method of the invention have disappeared.
Figure 9:
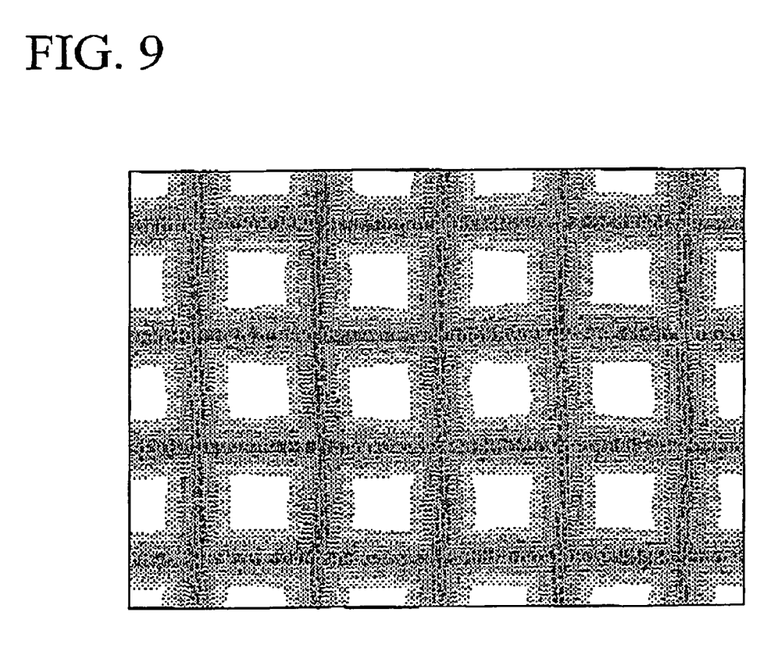
FIG. 9 shows a state of in that the pitch of the moiré fringes obtained by the method of the invention is great.
Figure 10:
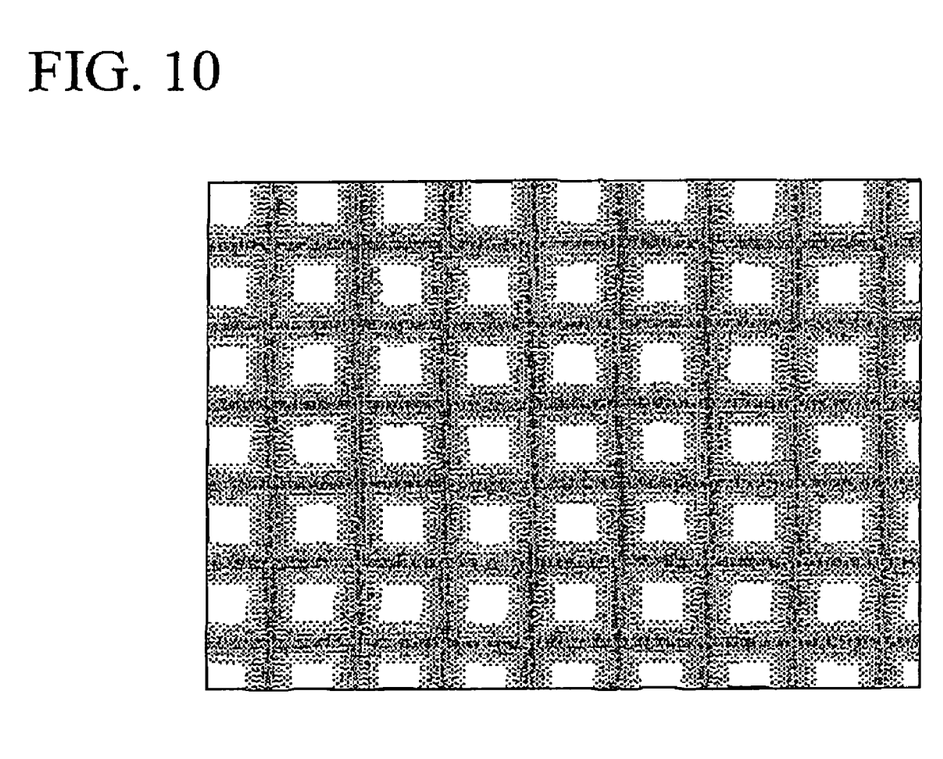
FIG. 10 shows a state of in that the pitch of the moiré fringes obtained by the method of the invention is minimal.

FIGS. 8 to 10 show results in which the inventors of the invention have actually examined the appearance of variation of the moiré fringes by varying the pitch of the grids.

FIGS. 8 to 10 have been illustrated from image pictures which are photographed on the actual screen.

FIG. 8 shows a state where the moiré fringes have disappeared. Only the grid pattern shown in FIG. 8 can be discovered. In FIG. 8, the black matrix image 7 is coincided with the grid lines 4.

FIG. 9 shows a state in which the pitch of the moiré fringes is great. FIG. 10 is a view showing a state of in that the pitch of the moiré fringes is minimal.

By slightly varying the amount of pitch between the black matrix image 7 and the grid lines 4, it is possible to greatly vary the pitch of the moiré fringes as described above, and it is easy to measure the gradient of the moiré fringes or the like.

In a second point, it is possible to measure the focalization of a projection lens.

Specifically, as shown in Part (D) shown in lower and right side of FIG. 2, the images are formed in reference boxes (twenty four reference boxes are equally divided in an example of FIG. 2), respectively. The image is leveled in each reference box, based on the image shown in Part (B) of FIG. 2, in which the grid image component is removed. Thereby, due to the light and shade in each reference box, it is possible to obtain the distribution of focalization.

This utilizes the phenomenon in which the width of the moiré fringes is broadened depending on the blurring of the focalization.

For example, in an example of Part (D) of FIG. 2, the deep color of the upper right side means the width of the moiré fringes 8 is broadened. In this region, the blurring of the focalization can be discovered, compared with the lower left side region.

Also, by observing the appearance of the moiré fringes 8 by using the evaluation method of the first embodiment, there is a possibility that various optical characteristics can be measured and evaluated.

If a zooming mechanism is installed on the projection lens 5, it is possible to easily vary the intensity of the moiré fringes by varying the pitch of grid, and make more precise measurement.

In the method of the first embodiment, by providing the existing projector and the screen 3 on which the grid lines 4 are drawn, and observing the moiré fringes 8, it is possible to evaluate the optical characteristics of the projector, especially the projection lens 5 including distortion, focalization, or the like.

Therefore, it is unnecessary to use a special measuring device. It is sufficient to only provide the constitution in which the image of the projector can be projected onto a screen.

Therefore, it is possible to perform the evaluation of the optical characteristics of the projector simply, quickly, and inexpensively compared with conventional methods.

The method of the first embodiment is not a method similar to a conventional measuring device, in which a plurality of measurement points is determined on a projection surface and the measuring is performed at the measurement points.

Since the moiré fringes 8 appearing on the entire projection surface are observed it is possible to realize contiguous evaluation on the entire optical system.

Furthermore, by adjusting the relationship between the pitch of black matrix image 7 and the pitch of grid lines 4, it is possible to enlarge the moiré fringes 8, and also realize the measuring with a high level of precision.

In the first embodiment, by performing white display from the entire liquid crystal light valve 1 and by projecting the image formed in the liquid crystal light valve 1, the moiré fringes are generated on the screen 3, which are caused by the image based on the black matrix 2 and the grid lines 4 formed on the screen 3.

The liquid crystal light valve 1 originally includes the black matrix, and the black matrix is utilized for generation of the moiré fringes.

Instead of this constitution for example, the image of a grid pattern may be formed in the liquid crystal light valve 1, and the moiré fringes may be generated between the grid lines 4 drawn on the screen 3 and the projected image that is formed by projecting the image formed in the liquid crystal light valve 1. Therefore, it is possible to obtain the effects similar to the above-described effects.

In the case of using the black matrix, the pitch of black matrix image can not be varied.

In contrast, in this manner, the formation of the grid pattern image or the pitch of the grid pattern image can be freely varied by the liquid crystal light valve. Thereby, it is possible to easily perform the evaluation while varying the generation state of the moiré fringes, as needed.

Second Embodiment

A second embodiment of the invention will be described below with reference to FIGS. 3A to 3C.

The second embodiment is an example of a method for measuring and evaluation of the optical characteristics of a projection lens used for the projector, or for a single lens, but not for a whole device.

Of course, the method for measuring and evaluation in the second embodiment can be applied to an optical system (lens) of an optical device other than the projector.

Figure 3A:
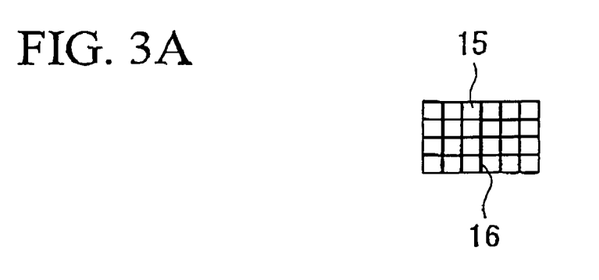
FIG. 3A is a plan view showing a translucent grid plate.
Figure 3B:
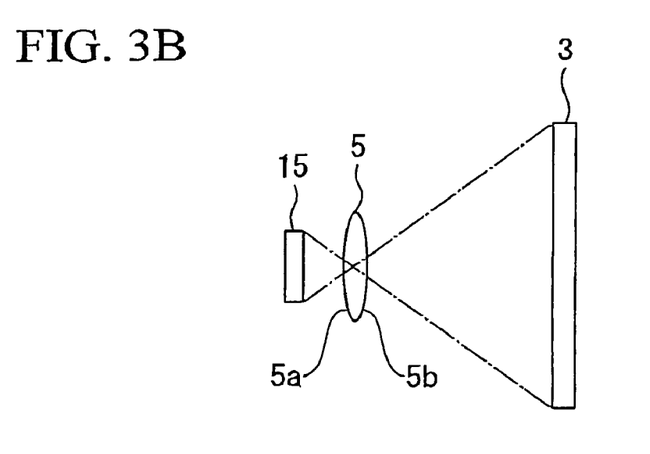
FIG. 3B is a cross-sectional view showing a translucent grid plate, the projection lens, and the screen.
Figure 3C:
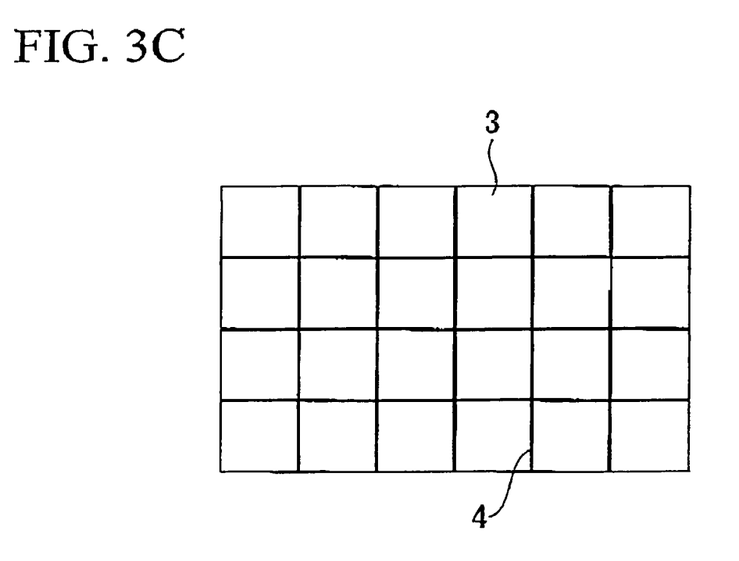
FIG. 3C is a plan view showing the screen.

FIGS. 3A to 3C are schematic diagrams for explanation of evaluation method for evaluating optical characteristics of the second embodiment. FIG. 3A is a plan view showing a translucent grid plate 15. FIG. 3B is a cross-sectional view showing the translucent grid plate 15, the projection lens 5, and the screen 3. FIG. 3C is a plan view showing the screen 3.

In FIGS. 3A to 3C, the identical symbols are used for the elements which are identical to those of the above-described embodiment in FIGS. 1A to 1C, and the explanations thereof are omitted.

In the case of the second embodiment, the optical characteristics of the projection lens 5 separated from the projector is measured. This means no use of the black matrix (liquid crystal light valve) functioning as the first pattern in the first embodiment.

Therefore, in the second embodiment, instead of the liquid crystal light valve of the first embodiment, the translucent grid plate 15 is disposed in the optical path in which the light is incident onto the light incidence section 5a.

The translucent grid plate 15 includes a light absorbing member 16 (first pattern) corresponding to the black matrix of the liquid crystal light valve of the first embodiment.

Specifically, the light absorbing member may be formed by drawing black lines or the like on a translucent plate member such as a glass plate or the like. A grid plate may be formed by etching a thin-copperplate or the like and by forming openings on the thin-copperplate.

In addition, a light source is provided (not shown) for illuminating the translucent grid plate 15 with the light when measuring.

In the method of the second embodiment, by only providing the translucent grid plate 15 and the screen 3 on which the grid lines 4 are drawn, it is possible to evaluate the optical characteristics of the projection lens 5 by observing the moiré fringes.

Therefore, it is possible to obtain the above-described effects similar to the effects in the first embodiment. That is, it is unnecessary to use a special measuring device. It is possible to perform the evaluation of the optical characteristics, simply, quickly, and inexpensively compared with a conventional method. It is possible to realize contiguous evaluation on the entire optical system. It is possible to realize the measuring with a higher level of precision by enlarging the moiré fringes.

In the second embodiment described above, the example is explained in which the translucent grid plate 15 previously having the first pattern is used. However, the first pattern may be a pattern which is formed by projecting or displaying any pattern onto the translucent plate member, and is not only limited to the above-described constitution.

That is, the plate member referred to in the second embodiment may be not only merely a plate member, but also a screen or a light modulation element.

In this manner, since the formation of the first pattern or the pitch of the first pattern can be freely varied, it is possible to easily realize the evaluation while varying generation state of moiré fringes, as needed.

Third Embodiment

A third embodiment of the invention will be described below with reference to FIGS. 4A and 4B.

The third embodiment is an example of a measuring and evaluation method for evaluating the optical characteristics of the projection lens which is a single lens.

The third embodiment is different from the second embodiment in that there is no use of the screen on which grid lines are drawn.

Figure 4A:
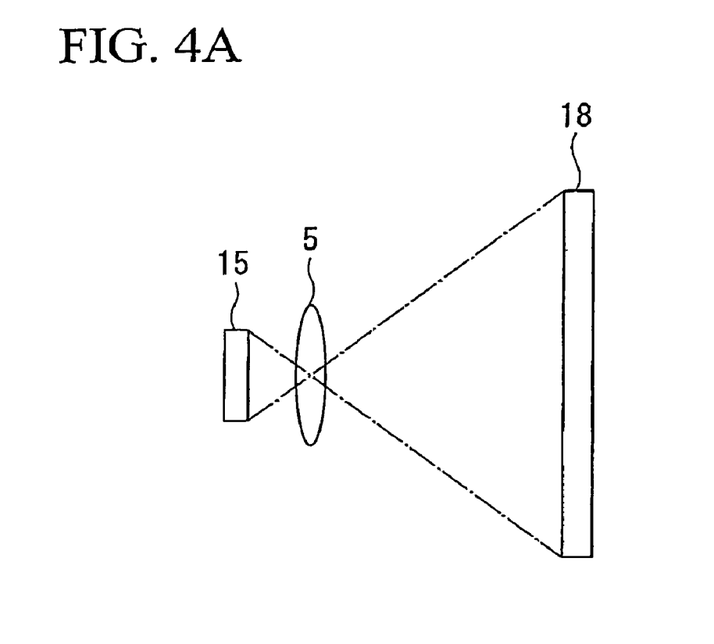
FIGS. 4A and 4B are cross-sectional views showing schematic diagrams for explanation of an evaluation method for evaluating optical characteristics of a third embodiment of the invention.
Figure 4B:
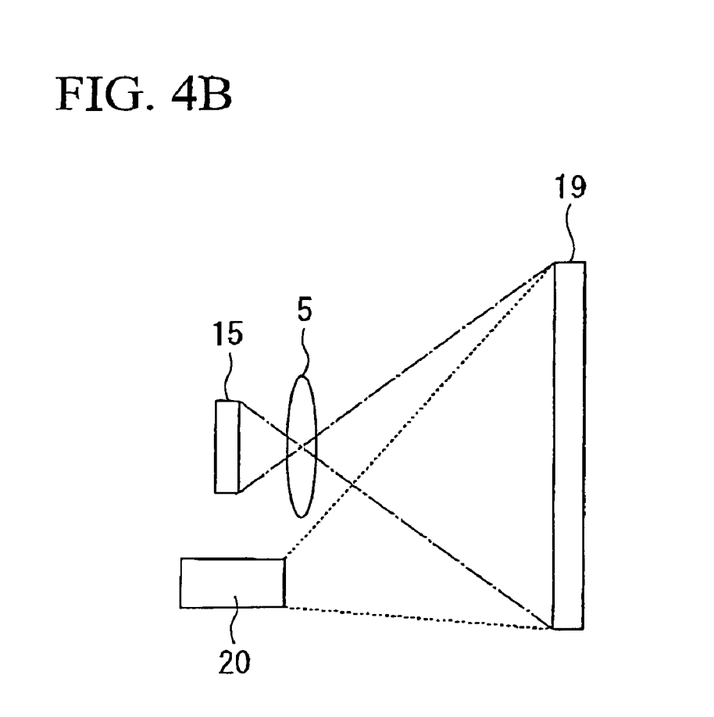

FIGS. 4A and 4B are cross-sectional views showing schematic diagrams for explanation of evaluation method for evaluating optical characteristics of the third embodiment.

In FIGS. 4A and 4B, the identical symbols are used for the elements which are identical to those of the above-described embodiment in FIGS. 3A to 3C, and the explanations thereof are omitted.

As shown in FIGS. 4A and 4B, the method of the third embodiment is similar to that of the second embodiment in that they use the translucent grid plate 15.

However, in FIG. 4A, a direct view-type display 19, such as a plasma display, a liquid crystal display, or the like instead of the screen on which the grid lines are drawn. The direct view-type display 18 displays grid lines functioning as a second grid pattern (second pattern). In FIG. 4B, the image of the grid lines is projected onto the screen 19 on which no grid lines are drawn, by using another projector 20.

In the method of the third embodiment, it is possible to obtain the above-described effects similar to the effects of the first embodiment and the second embodiment. That is, it is possible to evaluate the optical characteristics of the projection lens by observing the moiré fringes. It is necessary to use a special measuring device. It is possible to perform the evaluation of the optical characteristics, simply, quickly, and inexpensively compared with a conventional method. It is possible to realize contiguous evaluation on the entire optical system, or the like.

Furthermore, in the third embodiment, the grids on the screen side are the image which is displayed onto the screen. It is possible to freely vary the pitch of the grids. Thereby, it is possible to easily vary the intensity or the magnification of the moiré fringes generated on the screen. It is possible to measure a fixed focus lens.

In addition, in the constitution shown in FIG. 4B, the projector 20 is necessary for projecting the grid pattern. However, it is possible to realize the measuring and the evaluation by using a conventional screen on which no grid pattern is drawn.

The method of the third embodiment can be combined with that of the first embodiment in which the whole projector is evaluated, not just a single lens.

Fourth Embodiment

A fourth embodiment of the invention will be described below with reference to FIGS. 5A to 5C and 7.

The evaluation method itself of the fourth embodiment is similar to the first embodiment and the second embodiment. However, the characteristic difference is that the evaluation object is a reflection optical system using an aspheric mirror or a free-form surface mirror.

Figure 5A:
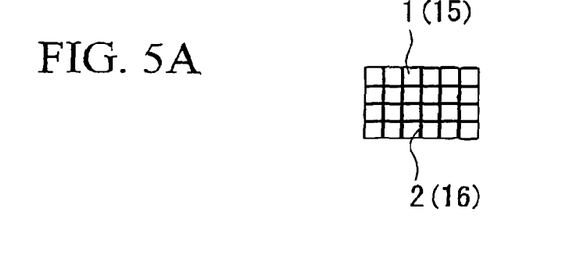
FIG. 5A is a plan view showing the liquid crystal light valve (translucent grid plate).
Figure 5B:
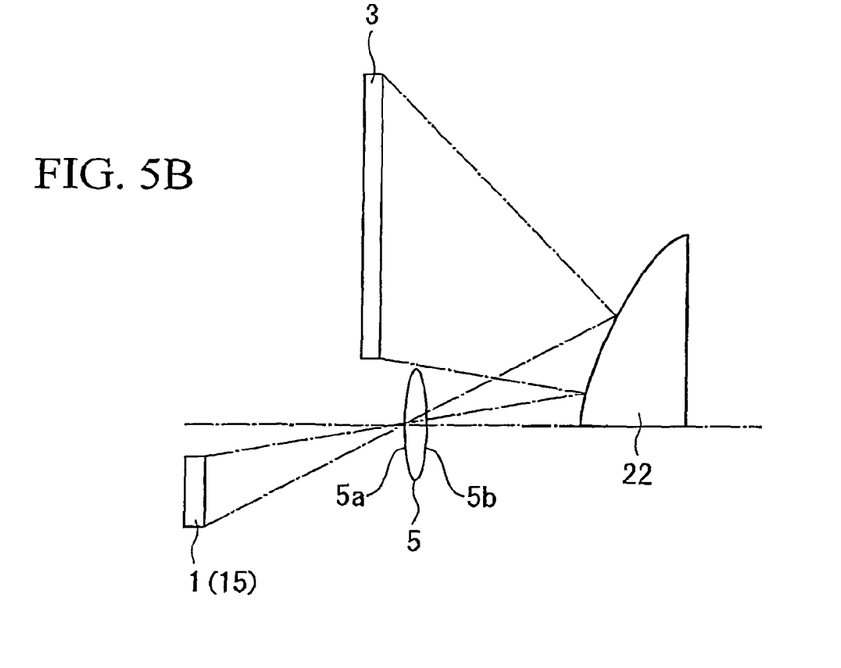
FIG. 5B is a cross-sectional view showing the liquid crystal light valve (translucent grid plate), the projection lens, an aspheric mirror, and the screen.
Figure 5C:
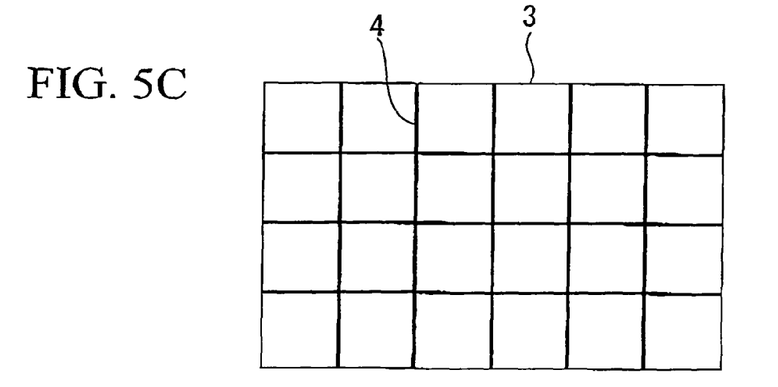
FIG. 5C is a plan view showing the screen.

FIGS. 5A to 5C are schematic diagrams for explanation of the evaluation method for evaluating optical characteristics of the fourth embodiment FIG. 5A is a plan view showing the liquid crystal light valve 1 (translucent grid plate 15). FIG. 5B is a cross-sectional view showing the liquid crystal light valve 1 (translucent grid plate 15), the projection lens 5, an aspheric mirror 22, and the screen 3. FIG. 5C is a plan view showing the screen 3.

In FIGS. 5A to 5C, the identical symbols are used for the elements which are identical to those of the above-described embodiment in FIGS. 1A to 1C and 3A to 3C, and the explanations thereof are omitted.

Figure 7:
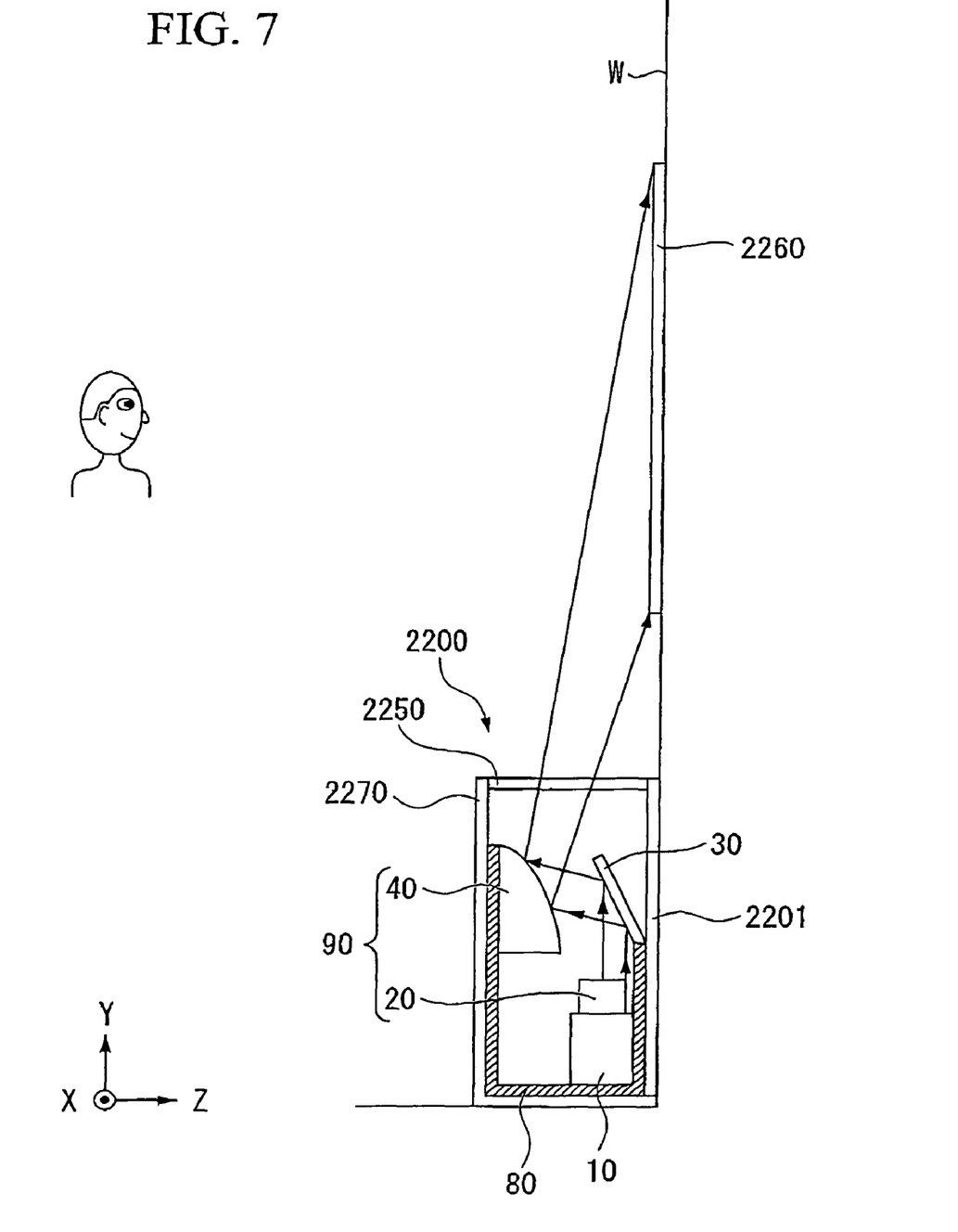
FIG. 7 is a schematic diagram of a projector including an ultra short-focus optical system.

FIG. 7 is a schematic diagram of a projector including the ultra short-focus optical system having the above-described reflection optical system.

At first, the projector including the ultra short-focus optical system is briefly explained with reference to FIG. 7.

The projector 2200 is referred to as a front projection-type projector, in which light is projected onto a screen 2260 installed at a wall W exterior to the projector 2200 in accordance with an image signal. Viewers are able to observe the light reflected by the screen 2260.

An optical engine section 10 is installed on bottom face 80 interior to a casing 2270 so that a projection lens 20 faces upward.

The optical engine section 10 leads the light modulated as accordance with the image signal to emit upwardly through the projection lens 20.

In the interior of casing 2270, a first mirror 30 is installed at a position at which the first mirror 30 faces to the projection lens 20 and the second mirror 40. The second mirror 40 will be described below.

The first mirror 30 reflects the light emitted from the projection lens 20 toward the second mirror 40.

The first mirror 30 includes a substantially even reflection surface. The first mirror 30 can be manufactured by forming, for example, metal layer having high reflectivity such as aluminum or the like, or a reflection layer composed by a dielectric multilayer, on a flat plate.

On the other hand, the second mirror 40 is installed at a position at which the second mirror 40 faces the first mirror 30 disposed at the back side of the casing 2270.

The second mirror 40 leads the light emitted from the first mirror 30 to reflect at approximately 90° by reflecting the light. Furthermore, the second mirror 40 leads the light to project toward the screen 2260 at a wide angle.

Since the second mirror 40 includes a curved surface, it is possible to realize the reflection of the light together with wide angle projection.

Especially, in order to optimize the optical characteristics, it is desirable that the second mirror 40 include the aspheric-form surface or the free-form surface.

As described above, in a recent optical system of a projector, a reflection optical element such as an aspheric mirror or the like is often used. A lot of aspheric mirrors are used in the projector. In the aspheric mirror, a resin is often used as a material of a base member. In order to determine conditions of manufacturing the base member, the conditions of manufacturing is often optimized while projecting the images actually reflected by the mirror.

In addition, there is a method for optimizing and determining the conditions of manufacture so that the formation of the mirror becomes an ideal formation while measuring the formation of the mirror. However, in forming the surface of the mirror, high precision such as wavelength order is necessary in the forming. Therefore, the method in which the conditions are optimized while watching the images is a conventional method.

However, as described above, since the optical paths are complex in the case of evaluating the optical system including this kind of reflection optical element, great alteration is necessary to use a conventional measuring device. Therefore, custom-made measuring devices have often been needed every changing the optical constitution.

In the method of the fourth embodiment, as shown in FIGS. 5A to 5C, the liquid crystal light valve 1 or the translucent grid plate 15 is disposed in the optical path in which the light is incident onto the light incidence section 5a of the projection lens 5, and the aspheric mirror 22 is disposed in the optical path in which the light is emitted from the light emission section 5b of the projection lens 5.

Furthermore, the grid image based on the first pattern of the liquid crystal light valve 1 or the translucent grid plate 15 is projected onto the screen 3 through the projection lens 5 and reflected by the aspheric mirror 22.

The grid lines 4 are drawn on the screen 3 similar to the first and the second embodiment. Due to the interference between the grid image and the grid lines 4, the moiré fringes are generated.

By observing the moiré fringes or by performing the image processing, it is possible to measure and evaluate the optical characteristics of the optical system, including the projection lens 5 and the aspheric mirror 22.

Especially, in the case of including a constitution in which only the aspheric mirror 22 can be altered, it is possible to obtain the precise formation of the aspheric mirror 22 by observing the moiré fringes on the screen 3.

In the method of the fourth embodiment, it is possible to obtain the above-described effects similar to the effects in the first embodiment, the second embodiment, and the third embodiment. That is, it is possible to evaluate the optical characteristics by observing the moiré fringes. It is unnecessary to use a special measuring device. It is possible to perform the evaluation of the optical characteristics, simply, quickly, and inexpensively. It is possible to realize contiguous evaluation on the entire optical system, or the like.

In the method of the fourth embodiment, especially, in the case of optimizing the conditions of manufacturing the mirror, it is possible to measure wavelength order due to the moiré fringes. Therefore, it is possible to form the aspheric mirror or the free-form surface mirror with a high level of precision.

Furthermore, since it is possible to contiguously measure the errors of formation of the mirror in the entire surface of the mirror, it is easy to determine the manufacturing conditions of the mirror. It is possible to realize a reduction in manufacturing cost.

Fifth Embodiment

A fifth embodiment of the invention will be described below with reference to FIGS. 6A to 6C.

The evaluation object and the evaluation method of the fifth embodiment are similar to the fourth embodiment. However, there is a difference between the fifth embodiment and the fourth embodiment, in the point of determining the formation of the aspheric mirror or the free-form surface mirror based on the feedback from the evaluation result.

Figure 6A:
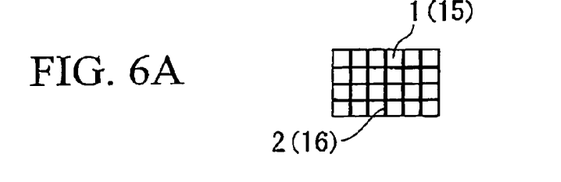
FIG. 6A is a plan view showing the liquid crystal light valve (translucent grid plate).
Figure 6B:
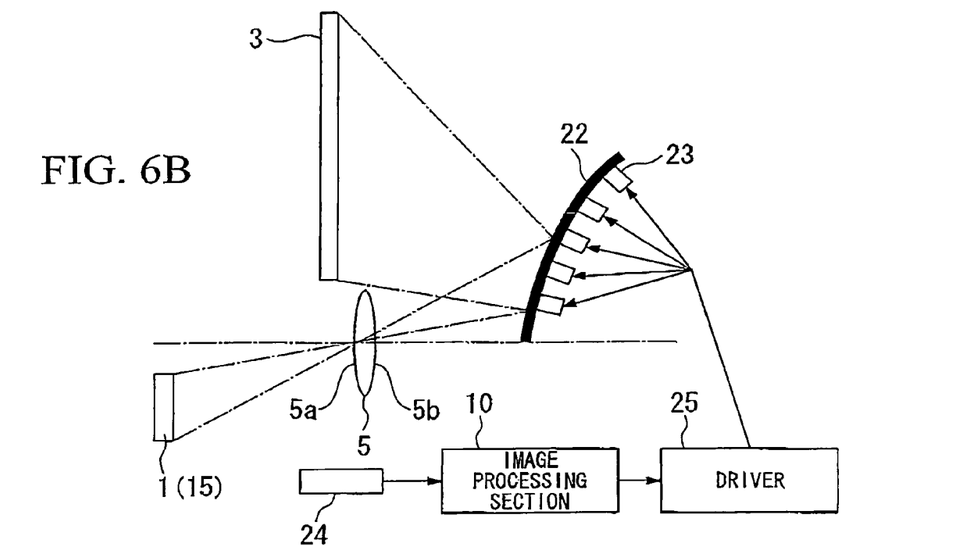
FIG. 6B is a cross-sectional view showing the liquid crystal light valve (translucent grid plate), the projection lens, an aspheric mirror, and the screen
Figure 6C:
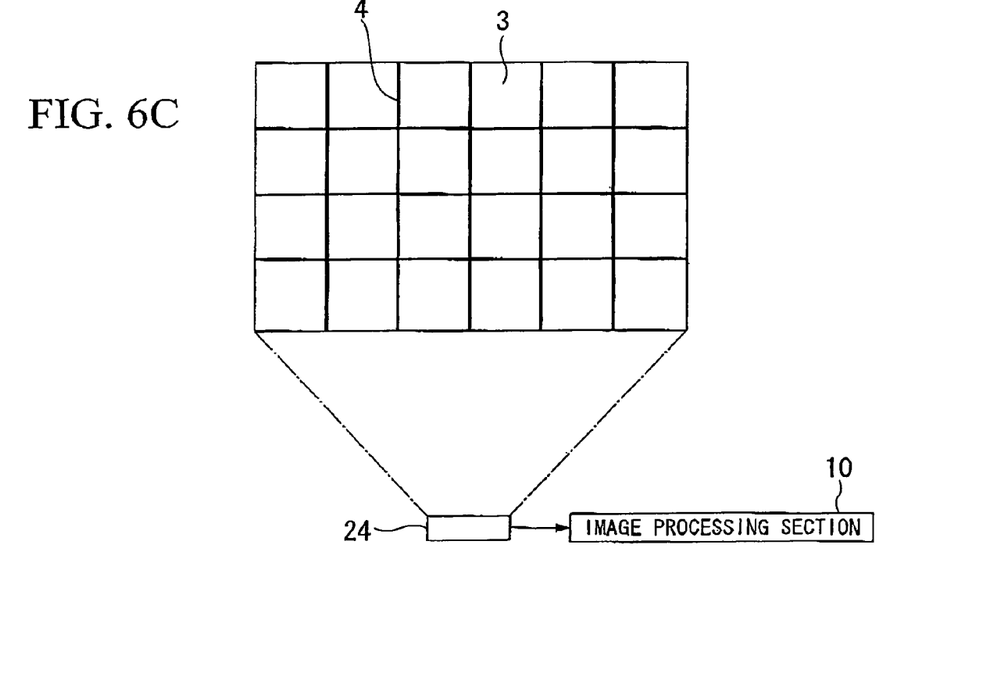
FIG. 6C is a plan view showing the screen.

FIGS. 6A to 6C are schematic diagrams for explanation of the evaluation method for evaluating optical characteristics of the fifth embodiment. FIG. 6A is a plan view showing the liquid crystal light valve 1 (translucent grid plate 15). FIG. 6B is a cross-sectional view showing the liquid crystal light valve 1 (translucent grid plate 15), the projection lens 5, an aspheric mirror 22, and the screen 3, and FIG. 6C is a plan view showing the screen 3.

In FIGS. 6A to 6C, the identical symbols are used for the elements which are identical to those of the above-described embodiment in FIGS. 5A to 5C, and the explanations thereof are omitted.

As shown in FIG. 6B, in the fifth embodiment, a plurality of piezoelectric elements 23 is installed on a back surface of the aspheric mirror 22.

As shown in FIGS. 6B and 6C, an image capturing element 24, an image processing section 10, and a driver 25 are installed. The image capturing element 24 photographs the images on the screen 3 and is constituted by a CCD or the like as explained in FIG. 2. The image processing section 10 processes the images photographed by the image capturing element 24. The driver 25 sends predetermined signals to the piezoelectric element 24 depending on the result of the image processing in the image processing section 10, and drives the piezoelectric element 24.

The liquid crystal light valve 1 or the translucent grid plate 15 is disposed in the optical path in which the light is incident onto the light incidence section 5a of the projection lens 5. Also, the aspheric mirror 22 is disposed in the optical path in which the light is emitted from the light emission section 5b of the projection lens 5. The screen 3 on which the grid lines 4 are drawn is disposed at the position to which the light reflected by the aspheric mirror 22 is reached.

This constitution is similar to the above-described embodiments.

Specifically, by using the algorithm of the image processing as shown in FIG. 2, distortion and focalization are detected. The image processing section 10 calculates where the aberration is generated among any portions of the aspheric mirror 22. Also, the image processing section 10 calculates which portions of the aspheric mirror 22 generate aberration.

Furthermore, the image processing section 10 sends the amount of deforming of the aspheric mirror 22 based on the result of calculation to the driver 25. The driver 25 sends driving signals to the piezoelectric elements 23.

When the predetermined piezoelectric element 23 deforms at predetermined amount, the aspheric mirror 22 is deformed depending on the piezoelectric element 23.

After the deforming, the optical characteristics of the same optical system are reevaluated. The measuring and evaluation are repeated until optimal distortion or a state of focalization can be obtained.

In the method of the fifth embodiment, it is possible to obtain the above-described effects similar to the effects in the first embodiment, the second embodiment, the third embodiment and the fourth embodiment. That is, it is possible to evaluate the optical characteristics by observing the moiré fringes. It is unnecessary to use special measuring devices. It is possible to perform the evaluation of the optical characteristics, simply, quickly, and inexpensively. It is possible to realize contiguous evaluation on the entire optical system, or the like.

Also, especially, in the fifth embodiment, it is possible to obtain the effects described below.

The optical systems using the aspheric mirror are often conventionally super-wide angle optical systems.

In the case of projecting the image which is enlarged at high magnification by using the aspheric mirror, distortion or focalization of the projected image is affected by the errors of formation or variance of formation in the aspheric mirror.

Furthermore, conventionally, the aspheric mirror is formed by the resin, the formation thereof is easily varied depending on ambient temperature change, and the projected image may be affected.

In contrast, in the method of the fifth embodiment, since the formation of mirror is adjusted based on the feedback from the evaluation result of optical characteristics, the formation of individual aspheric mirror 22 can be re-adjusted, even if it includes errors of formation (errors of forming).

In addition, even if the aspheric mirror 22 has deformed due to ambient temperature change, it is possible to be adjusted, as needed.

The technical scope of this invention shall not be limited to the above embodiments. As a matter of course, the invention may include various modifications of the embodiment in a scope not deviating from the spirit of this invention.

For example, each constitution grid pattern such as pitch or the like shown in the above-described embodiments can be selected, as needed.

In the above-described embodiments, the case in which both the first pattern and the second pattern are grid-like patterns is explained in the below example.

In the case of using the grid-like pattern, a state of focalization or distortion can be comprehended in both a horizontal direction and a vertical direction in a display. It is best case.

However, the invention shall not be limited to a grid-like pattern. A pattern other than the grid-like pattern described above, such as a stripe pattern or the like, in which the moiré fringes are generated may be used.

What is claimed is:

1. An evaluation method for evaluating optical characteristics of an optical system, the evaluation method comprising:
    providing a reflection optical system that is an evaluation object and that has a light incidence section and a light emission section, the reflection optical system including an aspheric mirror or a free-form surface mirror;
    disposing a first pattern having a fist predetermined pitch, in an optical path of light which is incident onto the light incidence section;
    disposing a projection surface having a second pattern with a second predetermined pitch, at the position to which the light emitted from the light emission section is reached;
    projecting an image of the first pattern onto the projection surface through the reflection optical system; and
    evaluating the optical characteristics of the aspheric mirror or the optical characteristics of the free-form surface mirror by observing a state of moiré fringes which are generated onto the projection surface due to interference between the image and the second pattern.

2. The evaluation method according to claim 1, wherein the first pattern is a pattern formed on a surface of a translucent plate member.

3. The evaluation method according to claim 1, wherein the first pattern is a pattern which is displayed on or projected onto a translucent plate member.

4. The evaluation method according to claim 1, wherein the second pattern is a pattern drawn on the projection surface.

5. The evaluation method according to claim 1, wherein the second pattern is a pattern which is displayed on or projected onto the projection surface.

6. The evaluation method according to claim 1, further comprising:
    deforming the aspheric mirror or the free-form surface mirror based on the observation result of the generation state of moiré fringes; and
    re-evaluating the optical characteristics of the aspheric mirror or the optical characteristics of the free-form surface mirror.

7. An evaluation method for evaluating a projector, comprising:
    providing a projector including a reflection optical system that is an evaluation object, a light modulation element that has a first pattern having a first predetermined pitch, and a projection surface that has a second pattern having a second predetermined pitch, the reflection optical system including an aspheric mirror or a free-form surface mirror;
    using the light modulation element and the projection surface;
    projecting an image of the first pattern of the light modulation element onto the projection surface through the reflection optical system; and
    evaluating the optical characteristics of the aspheric mirror or the optical characteristics of the free-form surface mirror by observing a state of moiré fringes which are generated onto the projection surface due to interference between the image and the second pattern.

8. The evaluation method according to claim 7, wherein the first pattern is a pattern which is displayed by the light modulation element.

9. The evaluation method according to claim 7, wherein the second pattern is a pattern drawn on the projection surface.

10. The evaluation method according to claim 7, wherein the second pattern is a pattern which is displayed on or projected onto the projection surface.

11. The evaluation method according to claim 7, further comprising:
deforming the aspheric mirror or the free-form surface mirror based on the observation result of the generation state of moiré fringes; and
re-evaluating the optical characteristics of the aspheric mirror or the optical characteristics of the free-form surface mirror.

12. An evaluation device for evaluating optical characteristics comprising:
a plate member that is disposed in an optical path of light which is incident onto a light incidence section of an optical system being an evaluation object, and that has a first pattern having a first predetermined pitch;
a light source illuminating the plate member with light;
an aspheric mirror disposed in the optical path in which the light is emitted from a light emission section of the optical system;
a plurality of piezoelectric elements installed on a back surface of the aspheric mirror; and
a projection surface onto which an image of the first pattern is projected, that has a second pattern having a second predetermined pitch, and that is disposed at the position to which the light emitted from the light emission section of the optical system is reached, the image being projected through the optical system.

* * * * *